(12) United States Patent
Huang et al.

(10) Patent No.: US 9,560,323 B2
(45) Date of Patent: *Jan. 31, 2017

(54) METHOD AND SYSTEM FOR METADATA EXTRACTION FROM MASTER-SLAVE CAMERAS TRACKING SYSTEM

(71) Applicant: Pelco, Inc., Clovis, CA (US)

(72) Inventors: Chien-Min Huang, Clovis, CA (US); Farzin Aghdasi, Clovis, MA (US); Hongwei Zhu, Natick, MA (US); Lei Wang, Clovis, CA (US); Zhan Jiang Ma, Clovis, CA (US)

(73) Assignee: Pelco, Inc., Clovis, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/939,222

(22) Filed: Nov. 12, 2015

(65) Prior Publication Data

US 2016/0191856 A1 Jun. 30, 2016

Related U.S. Application Data

(63) Continuation of application No. 13/682,606, filed on Nov. 20, 2012, now Pat. No. 9,210,385.

(51) Int. Cl.
*H04N 7/18* (2006.01)
*G06K 9/00* (2006.01)
(Continued)

(52) U.S. Cl.
CPC .......... *H04N 7/181* (2013.01); *G06K 9/00771* (2013.01); *G06K 9/209* (2013.01);
(Continued)

(58) Field of Classification Search
USPC ................ 348/159, 143, 144, 149, 152, 153
See application file for complete search history.

(56) References Cited

U.S. PATENT DOCUMENTS 5,850,352 A 12/1998 Moezzi et al.
7,629,995 B2 12/2009 Salivar et al.
(Continued)

FOREIGN PATENT DOCUMENTS

EP 1 696 398 A2 8/2006

OTHER PUBLICATIONS

Notification Concerning Transmittal of International Preliminary Report on Patentability and Written Opinion for PCT/US2013/070807, "Method and System for Metadata Extraction From Master-Slave Cameras Tracking," date of mailing: Jun. 4, 2015.
(Continued)

*Primary Examiner* — Paulos M Natnael
(74) *Attorney, Agent, or Firm* — Hamilton, Brook, Smith & Reynolds, P.C.

(57) ABSTRACT

An embodiment of the present invention includes a master camera that may record master metadata regarding an object of interest and communicate the master metadata to a slave camera. The slave camera may zoom, pan, or tilt to isolate and record more detailed image data regarding the object of interest based on the master metadata. In addition, the slave camera may record slave metadata regarding the object of interest. The master and slave metadata may be stored associated with the recorded image data enabling a later search for the object of interest to be expedited. The recorded image data including the object of interest may be identified with greater ease as it may be guided by the master or slave metadata, or a combination thereof. According to embodiments presented herein, processing time for searching and identifying an object of interest may be reduced by enabling a search on the metadata associated with image data, rather than by searching the image data itself.

21 Claims, 7 Drawing Sheets

(51) Int. Cl.
*G06K 9/20* (2006.01)
*G06K 9/62* (2006.01)
*G08B 13/196* (2006.01)

(52) U.S. Cl.
CPC ...... *G06K 9/6267* (2013.01); *G08B 13/19608* (2013.01); *G08B 13/19643* (2013.01); *G08B 13/19671* (2013.01)

(56) References Cited

U.S. PATENT DOCUMENTS

| | | |
|---|---|---|
| 7,801,329 B2 | 9/2010 | Miyamaki et al. |
| 8,531,519 B1 | 9/2013 | Peng et al. |
| 8,711,217 B2 | 4/2014 | Venetianer et al. |
| 9,210,385 B2 * | 12/2015 | Huang .................. H04N 7/181 |
| 2005/0134685 A1 | 6/2005 | Egnal et al. |
| 2005/0278618 A1 | 12/2005 | Ogikubo |
| 2006/0184553 A1 | 8/2006 | Liu et al. |
| 2006/0197839 A1 | 9/2006 | Senior et al. |
| 2007/0064107 A1 | 3/2007 | Aggarwal et al. |
| 2009/0219411 A1 | 9/2009 | Marman et al. |
| 2010/0141767 A1 | 6/2010 | Mohanty et al. |
| 2010/0208941 A1 | 8/2010 | Broaddus et al. |
| 2011/0128385 A1 | 6/2011 | Bedros et al. |
| 2013/0128022 A1 | 5/2013 | Bose et al. |
| 2014/0085480 A1 * | 3/2014 | Saptharishi .......... H04N 9/7921 348/159 |

OTHER PUBLICATIONS

Notification of Transmittal of the International Search Report and Written Opinion for PCT/US2013/070807, "Method and System for Metadata Extraction From Master-Slave Cameras Tracking," date of mailing: Mar. 27, 2014.

* cited by examiner

METHOD AND SYSTEM FOR METADATA EXTRACTION FROM MASTER-SLAVE CAMERAS TRACKING SYSTEM

RELATED APPLICATION

This application is a continuation of U.S. application Ser. No. 13/682,606, filed Nov. 20, 2012. The entire teachings of the above application are incorporated herein by reference.

BACKGROUND OF THE INVENTION

Video surveillance systems are used at many locations such as at a bank, store, airport, or any other location where security may be of interest. A video surveillance system may include a video camera that provides a video stream capturing images of whatever is within the field-of-view of the video camera's lens. The video stream may be monitored by a human operator and recorded for later review.

SUMMARY OF THE INVENTION

A method, corresponding system and apparatus, employed in conjunction with video surveillance are disclosed herein. An example embodiment includes a method of enabling retrieval of information from a video surveillance system that may comprise automatically identifying an object of interest in a video scene of a master camera or a slave camera, where the object of interest for the slave camera may be determined as a function of metadata from the master camera. The example embodiment may include automatically classifying at least one feature in the object of interest. The example embodiment may also include storing a representation of the at least one feature in a form of metadata, including the metadata from the master camera to the slave camera, associated with video of at least the slave camera in a manner enabling retrieval of information about the object of interest. The object of interest may be a real-world object.

The metadata may further include slave metadata associated with the object identified. Retrieval may be more efficient on average via the metadata than via direct observation of the video. Identifying an object of interest may include applying background subtraction to remove background objects from the video scene.

The metadata may further include slave metadata associated with the object identified, and the example embodiment may further include tracking the object of interest by adjusting the slave camera's field of view based on object information included in the metadata from the master camera. Adjusting the slave camera's field of view may include zooming in on the object of interest and following movement of the object of interest. The slave metadata may include a start time stamp indicating a start time of the slave camera's tracking the object and an end time stamp indicating an end time of the slave camera's tracking the object. Adjusting the slave camera's field of view may be further based on processing the video scene at the slave camera based on the object information from the master camera. The slave metadata may include detailed object information extracted from the video scene by the slave camera. Processing the video scene may include searching of one or more image frames of the slave camera captured during tracking, the searching may be based on the object information included in the metadata from the master camera and the slave camera. Adjusting the slave camera's field of view may include directing the slave camera to a pan and tilt position. The example embodiment may further include analyzing one or more image frames of the slave camera during tracking, extracting detailed object information from the one or more image frames, and storing the detailed object information extracted as the slave metadata.

Automatically classifying at least one feature in the object of interest may include categorizing the object of interest as a person, vehicle, or animal.

Automatically classifying at least one feature in the object of interest may include classifying movement of the object identified as stationary or moving, wherein a moving classification may further include an estimated rate of movement of the object identified.

The metadata may include a time stamp, identified color, identified license plate number, aspect ratio, or bounding box for the object of interest.

The form of metadata may further include slave metadata associated with the object identified. The example embodiment may further include storing the metadata on a server.

Automatically identifying the object of interest, automatically classifying at least one feature in the object of interest, and storing the representation of the at least one feature in the form of metadata may occur during recording of the video scene.

Automatically identifying the object of interest, automatically classifying at least one feature in the object of interest, and storing the representation of the at least one feature in the form of metadata may occur after recording of the video scene.

The form of metadata further includes slave metadata associated with the object identified. The example embodiment may further include presenting the form of metadata and classifications of the object identified to a user.

Another example embodiment includes a system for enabling retrieval of information from a video surveillance system. The example embodiment may include a master camera, a slave camera, and a server communicatively coupled. The master camera may be configured to identify an object of interest automatically in a video scene of the master camera and to communicate master classification information of the object identified in the form of master metadata to the slave and to the server. The slave camera may be configured to determine more detailed slave classification information based on the master classification information communicated and to communicate the more detailed slave classification information in the form of slave metadata to the server. The server may be configured to store the master classification information and the detailed slave classification information in a manner enabling retrieval of information about the object of interest.

The slave camera may be further configured to communicate the more detailed slave classification information in the form of slave metadata to the master camera or an indication that the master classification information communicated is incorrect and the server may overwrite an object category of the metadata from the master camera with an object category of the metadata from the slave camera.

The master camera may be further configured to include a master bounding box for the video scene in the form of metadata and the slave camera is further configured to define a slave bounding box for the video scene based on the master bounding box, the more detailed slave classification information may be based on data of the video scene within the slave bounding box. The slave camera may define the slave bounding box as a function of metadata from the master and its own processor. The master metadata may include data of a master bounding box and the slave camera may use data of objects within the master bounding box.

Another example embodiment of a method includes enabling retrieval of information from a video surveillance system. The example embodiment may include presenting a representation of at least one feature in an object of interest in a form of metadata from a master camera and a slave camera in a manner enabling retrieval of information about the object of interest. The metadata from the master camera may include classification information about the object of interest. The metadata from the slave camera may include more detailed classification information about the object of interest.

Further, an example embodiment of a non-transient computer-readable medium having stored thereon a sequence of instructions, which, when loaded and executed by a processor may cause the processor to retrieve information from a video surveillance system. The sequence of instructions may further cause the processor to automatically identify an object of interest in a video scene of a master camera or a slave camera, where the object of interest for the slave camera may be determined as a function of metadata from the master camera. The sequence of instructions may further cause the processor to automatically classifying at least one feature in the object of interest. The sequence of instructions may further cause the processor to store a representation of the at least one feature in a form of metadata, including the metadata from the master camera to the slave camera, associated with video of at least the slave camera in a manner enabling retrieval of information about the object of interest.

It should be understood that embodiments of the present invention can be implemented in the form of a method, apparatus, system, or computer readable medium with program codes embodied thereon. In general, it should be understood that elements of the method, block, and flow diagrams described herein may be implemented in software, hardware, firmware, as understood by one of ordinary skill in the art. Example embodiments of the present invention may include a non-transitory computer readable medium containing instructions that may be loaded and executed by a processor, and, when executed, cause the processor to complete methods described herein. For ease of reading, the term "system" is used in various portions of the description and may represent some or all forms of embodiments and implementations of the present invention, such as systems, methods, apparatuses, devices, computer readable media, network nodes, and networks.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

Operators may need to view recorded surveillance image data in order to identify an object of interest that may be included in the recorded surveillance image data. The search for the object of interest may be a laborious and time consuming task for an operator. According to embodiments disclosed herein, a slave camera may be configured to zoom in on an object of interest in order to provide more detailed images. Whenever an object is detected, the slave camera may be directed to view the details of the scene. Important information may be extracted automatically enabling a more useful video surveillance system.

According to one embodiment, a master camera may record master metadata regarding an object of interest and communicate the master metadata to a slave camera. The slave camera may zoom, pan, or tilt to isolate and record more detailed image data regarding the object of interest based on the master metadata. In addition, the slave camera may record slave metadata regarding the object of interest. The master and slave metadata may be stored associated with the recorded image data enabling a later expedited search for the object of interest. The recorded image data including the object of interest may be identified with greater ease as it may be guided by the master or slave metadata, or a combination thereof.

Figure 1A:
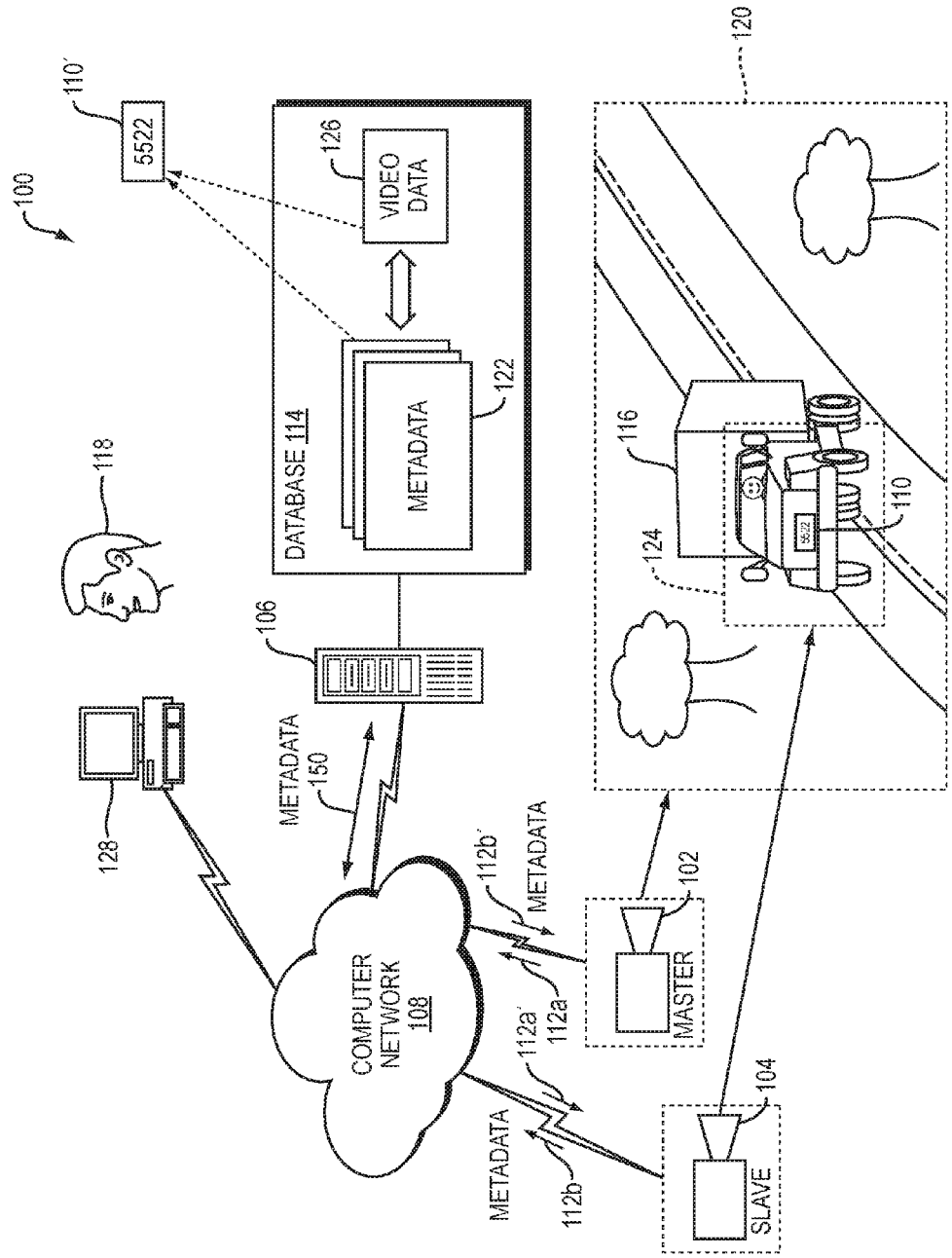
FIG. 1A illustrates a system for enabling retrieval of information from a video surveillance system.

FIG. 1A illustrates a system for enabling retrieval of information from a video surveillance system 100. The system 100 may comprise a master camera 102, a slave camera 104, a user device 128, and a server 106 communicatively coupled via a computer network 108. The computer network 108 may be wired, wireless, or any combination thereof.

According to embodiments disclosed herein, metadata from a master camera 102 may be communicated to one or more slave cameras 104, providing information to the one or more slave cameras to enhance processing performance and capabilities of the one or more slaves. For example, the master camera 102 may communicate color or aspect ratio to be used by a slave to identify important objects. By providing a slave camera with metadata 150 that may include attributes such as location, size, moving speed, moving direction, shape, color or aspect ratio, the slave camera may use the information to reduce processing for finding the important objects (e.g., the one or more objects of interest). Processing time for searching and identifying an object of interest may be reduced by enabling a search on the metadata associated with image data, rather than by searching the image data itself. Objects in the field of view of a master camera may be classified by a scene analyzer. The scene analyzer may be a method for analyzing input video and generating classification information in the form of metadata for one or more objects of interest included in the input video. Object classification may be performed by the master camera or by an external server 106 or any other suitable device or system. The example embodiment may further include presenting the form of metadata and classifications of the object identified to a user 118. If presenting, presenting the form of metadata of the object identified to a user may include presenting on any suitable display device, such as the user device 128.

The master camera 102 may be configured to identify an object of interest automatically in a video scene of the master camera and to communicate master classification information of the object identified in the form of metadata 112*a* to the slave and to the server. The master camera 102 may include a processing engine (not shown) configured to perform general background-based scene analysis. After performing the analysis, useful information, in the form of metadata, may be extracted. An object of interest may be stationary or in motion. The slave camera may be configured to determine more detailed slave classification information based on the master classification information communicated. The slave camera may further be configured to communicate the more detailed slave classification information in the form of metadata 112*b* to the server.

The server 106 may be configured to store the master classification information and the detailed slave classification information in a manner enabling retrieval of information about the object of interest. The master classification information and the detailed slave classification information may be stored in memory (not shown) of the server 106 or in a database 114 communicatively coupled to the server 106. The server 106 may store a representation of at least one feature of the object of interest in a form of metadata 122. The metadata 122 may include the master metadata 112*a* or the slave metadata 112*b* or any combination thereof. The metadata 122 may be associated with video 126 of at least the slave camera in a manner enabling retrieval of information about the object of interest.

The master camera 102 and the slave camera 104 may be megapixel cameras or other suitable devices for capturing video in a surveillance system. The master camera 102 or slave camera 104 may be devices or systems. For example, the master camera 102 or slave camera 104 may be a digital video camera coupled to a computer or comprising a processor and memory. The master camera 102 may be fixed type master camera or any other suitable video capturing device. The slave camera 106 may be a pan, tilt, and zoom (PTZ) camera or any other suitable video capturing device. Different kinds of cameras may be used for the master or the slave camera. Any suitable camera known by one or ordinary skill in the art may be used. For example, a perspective, omni, thermal, near-IR, color, black-and-white, telephoto, zoom, or any other suitable camera, or any suitable camera/lens combination may be used.

The master camera 102 and the slave camera 104 may provide high-definition video streams to the server 106. The master camera 102 may configure the slave camera 104 to monitor a wide field of view and then digitally zoom in on a particular area or object of interest. For example, the video scene may include a truck 116 that may be leaving a bank. The truck 116 may be driven by a bank robber, and the object of interest 110 may be the license plate located on the truck 116. The slave camera 104 may be configured to digitally zoom in on the license plate 110, and, in this embodiment, an image 110' of the license plate 110 may be retrieved more quickly than previously possible through efficiencies gained through use of the metadata. Another slave camera (not shown) may be configured to track the face of the bank robber driving the truck via face detection.

The system of FIG. 1A illustrates one master camera 102 that may capture video of an entire surveillance area 120. The slave camera 104 may provide high-resolution images of one or more objects of interest 110. While FIG. 1A shows only one master and one slave camera, it should be understood that there may be multiple masters and/or there may be multiple slaves. For example, multiple slave cameras may be associated with a given master camera.

The master camera 102 and the slave camera 106 may communicate to enable a tracking system. Master and slave cameras may communicate in any suitable manner. For example, communication may be via the Internet using wireless or wired connections using any suitable protocol. The master and slave cameras may oversee an entire surveillance area. A slave camera may be directed to any region of interest in the entire surveillance area. The slave camera may be configured to zoom in on an object of interest in order to provide more detailed images. Whenever an object is detected, a slave camera may be directed to view the details of the scene. Important information may be extracted automatically enabling a more useful video surveillance system.

Figure 1B:
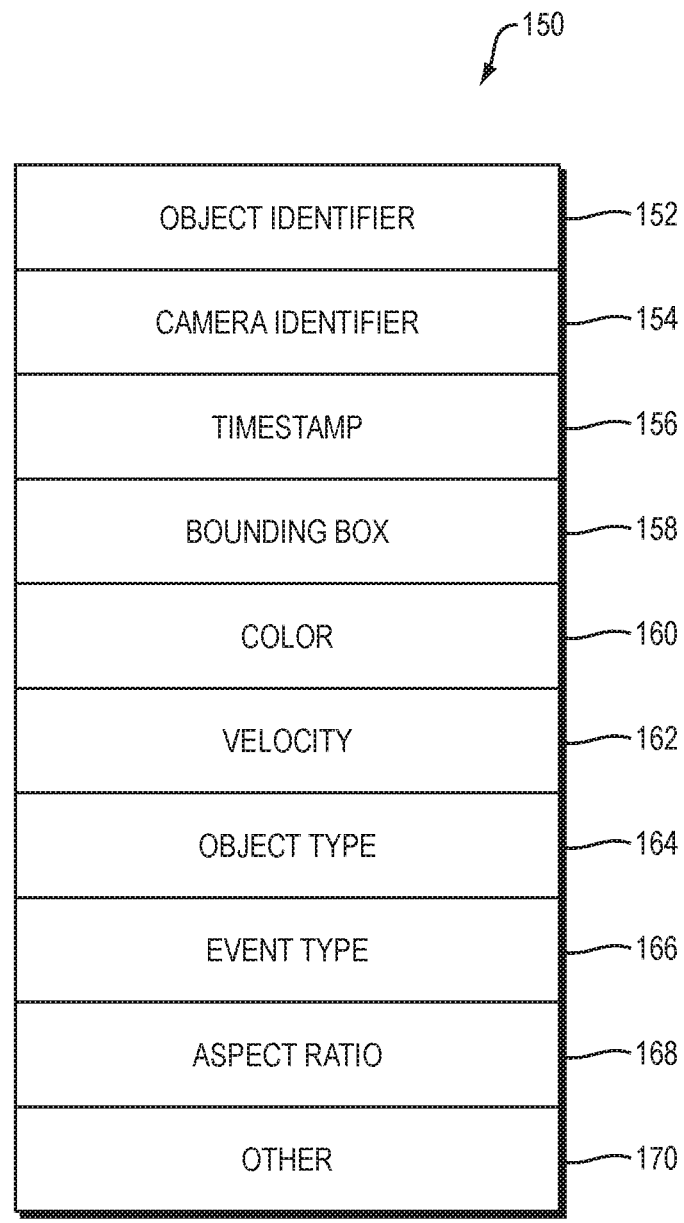
FIG. 1B illustrates an embodiment of metadata.

FIG. 1B illustrates an embodiment of metadata 150. The metadata 150 may include an object identifier 152, unique camera identifier 154, one or more time stamps 156, a bounding box 158, color 160, velocity 162, object type 164, event type 166, facial features, aspect ratio 160, and other suitable data 170. In terms of the scene 120 illustrated in FIG. 1A, a bounding box 158 may define a region of interest 124 in a video scene 120. The master metadata 112*a* or the slave metadata 112*b* may include all or any portion of the metadata 150.

The metadata 112*a* may be sent to server 106 for storing on a database 114. The slave camera 104 may "listen" to the master camera 102. For example, the master camera 102 may detect an object and assign one or more slave cameras to track the object. According to one aspect, the master camera 102 may send a "move" command to the slave camera 104. Along with the move command, a portion of the metadata 112*a*' of the object from the master camera 102 may be sent to the slave camera 104, such as the identifier of the master camera 102, the identifier of the object, the one or more time stamps, the color, the object type, etc. The slave camera 104 may track (e.g., follow) the object based on the metadata from the master camera 102.

According to embodiments disclosed herein, the metadata from the master camera 102 may be used to initialize specific processing that enables the slave camera 104 to find the object if the slave camera 104 has limited real-time processing power. After the processing, the slave camera 104 may extract metadata, of similar type as the metadata of the master camera 102. For example, the extracted metadata from the slave camera 102 may include one or more time stamps, bounding box, color, etc. Similar to the master camera 102 metadata 112*a*, the slave camera metadata 112*b* may be sent to the server 106 for storing on a database 114. In addition, all or a portion of the slave camera metadata 112*b*' may be sent to the master camera 102. Motion vectors of the slave cameras may be calculated via an optical flow method. The object in the field of view of the slave camera can be extracted via motion vector clustering if an object is moving against the background.

Figure 2:
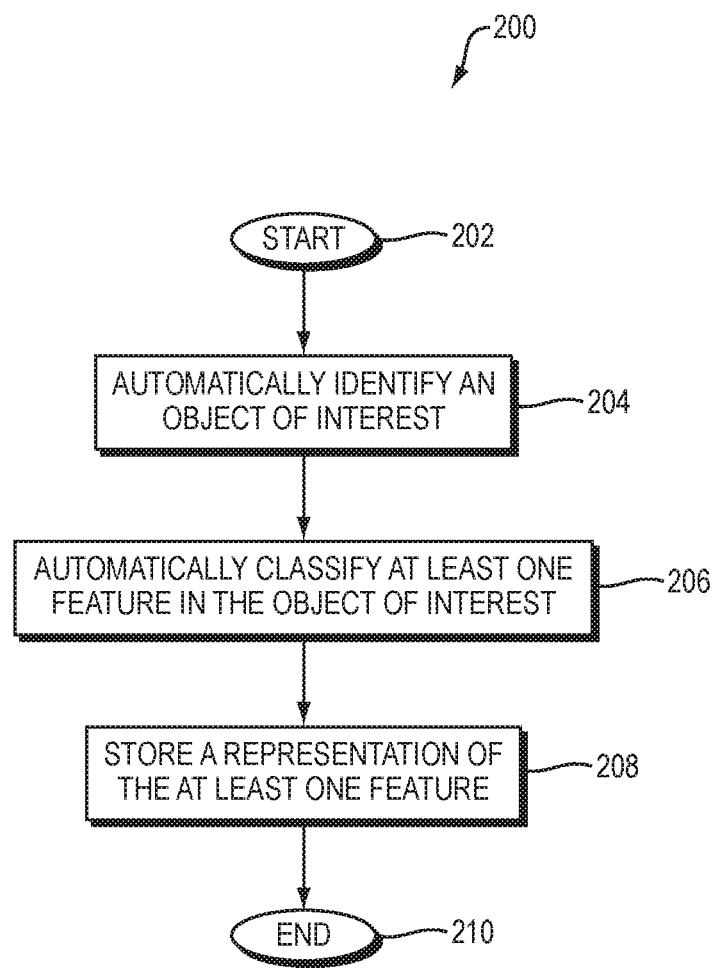
FIG. 2 illustrates a flow diagram of an embodiment of a method of enabling retrieval of information from a video surveillance system.

FIG. 2 illustrates a flow diagram of an embodiment of a method of enabling retrieval of information from a video surveillance system (200). The method may start (202) and automatically identify an object of interest in a video scene of a master camera or a slave camera, the object of interest for the slave camera being determined as a function of metadata from the master camera (204). The method may automatically classify at least one feature in the object of interest (206). The method may store a representation of the at least one feature in a form of metadata, including the metadata from the master camera to the slave camera, associated with video of at least the slave camera in a manner enabling retrieval of information about the object of interest (208). The method thereafter ends (210) in this example embodiment.

According to one embodiment, the server 106 may link the metadata 112a and 112b received from master and slave cameras. The link between the metadata of the master camera 102 and the slave camera 104 may serve as a guide for information retrieval. For example, an object or event of the master camera 102 may be located, and the link may guide a processor accessing the database to the record of the slave camera 104 in order to retrieve the corresponding image or video clip from the slave camera 104. According to another aspect, the metadata from the slave camera may include the identifier of the master camera, the identifier of the object on the master, and timestamps that correspond to the beginning and the end of tracking. The slave metadata may be retrieved by using the identifier of the master camera and the identifier of the object of the master camera. According to yet another embodiment, the master camera 102 may add some extra information to the metadata, such as an identifier of the slave camera that received the move command.

According to another embodiment, the server 106 may search the database 114 to find the object. If the object on the master camera 102 is found the video clip of the slave during the tracking of the object may be retrieved from the server 106. If the slave camera 104 has real-time processing power, metadata similar to the master metadata may have been sent and recorded, along with the video clip, and the image of the slave camera satisfying search criteria may be retrieved.

According to embodiments disclosed herein, metadata may be extracted by first applying a background subtraction-based method. The method may be used by the master camera to perform basic object detection and classification. Once the object is found, its color, direction, velocity, location, etc. may be obtained. More detailed information may be extracted from the original source image. According to one aspect, processing may be constrained by the image size. For example, if the source image is of high-definition television size, then the size of the processed image is likely to be Common Intermediate Format (CIF). According to another aspect, a more detailed image block may be extracted from the original high definition source image to obtain more metadata, such as color and other texture information.

According to the information obtained from the master camera, the slave camera may be moved to view more detailed information. Metadata from the slave camera may simply include a time stamp at the start of tracking and a time stamp at the end of tracking. A slave camera may perform a specific search based on the metadata information of the master camera. For example, object color and object type information. In the example, the master camera metadata may specify that an object type is human and a color is red, then a search may be performed on each image frame of the slave camera from when it begins tracking to when it terminates tracking. The search may be first configured to specifically look for humans. Color may be applied to speed up the search. Different search methods may be utilized, each search method targeting a specific object feature. The specific object feature may be specified in the metadata.

According to another embodiment, an assumption may be made that the information from the master camera is not accurate enough due to the small size of the object. In this example, the master camera may first direct the slave to the correct pan/tilt position, but with a lesser zooming factor. After the slave camera arrives at the position directed, a frame subtraction method or optical flow method may be used to analyze the scene and extract more accurate metadata. After extracting the more accurate metadata, the slave may return to a listening device state following a command from the master camera.

According to one embodiment, a master camera may extract metadata regarding an object of interest and communicate the metadata to a slave camera directly or via the server. The slave camera may provide more detailed information regarding the object of interest as the slave camera may zoom, pan, or tilt to isolate and capture more detailed image data regarding the object of interest. Metadata may be stored associated with the recorded image data enabling a later search for the object of interest to be expedited and enabling identification of the recorded image data including the object of interest with greater ease.

Figure 3A:
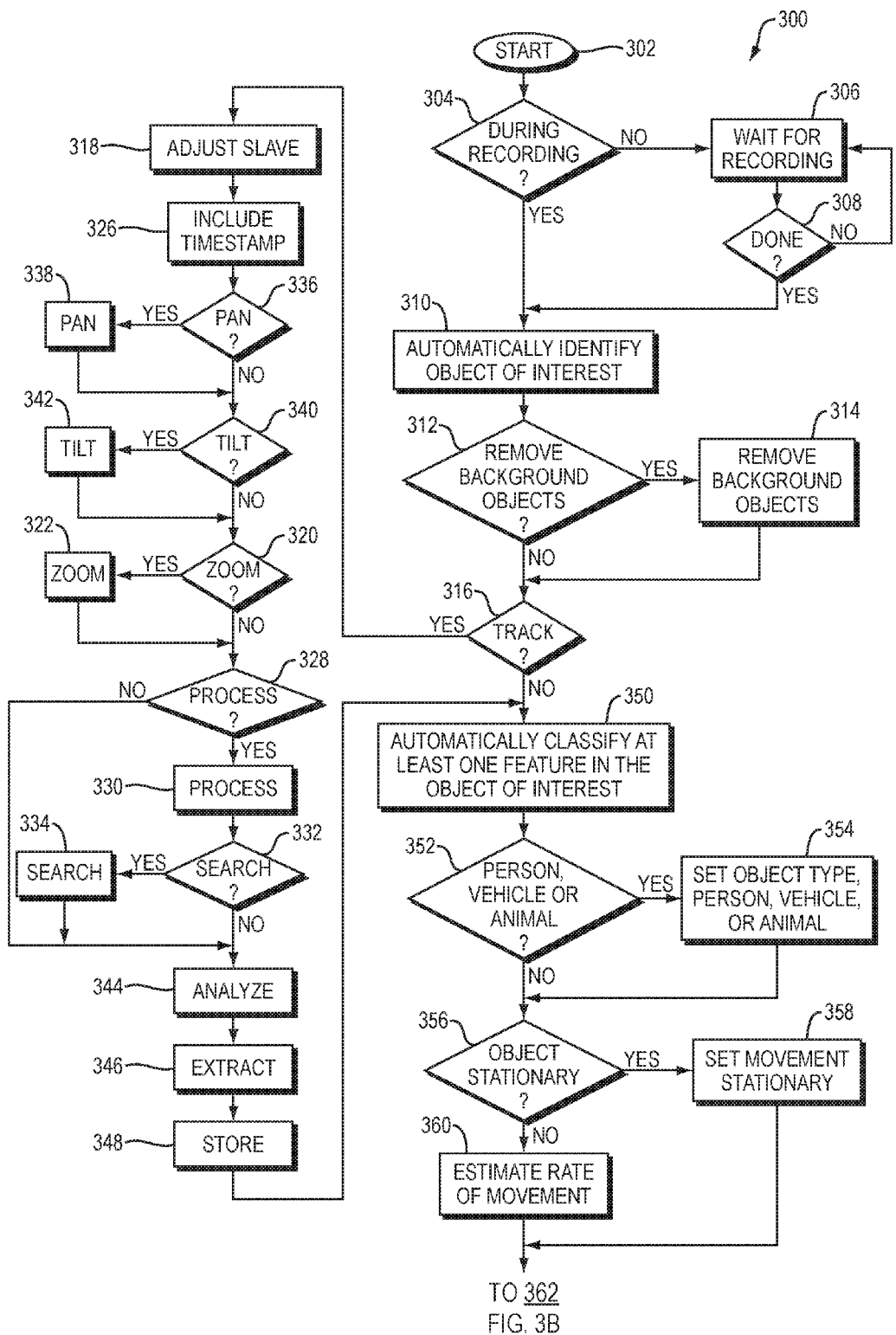
FIG. 3A and FIG. 3B illustrate a flow diagram of another embodiment of a method of enabling retrieval of information from a video surveillance system.
Figure 3B:
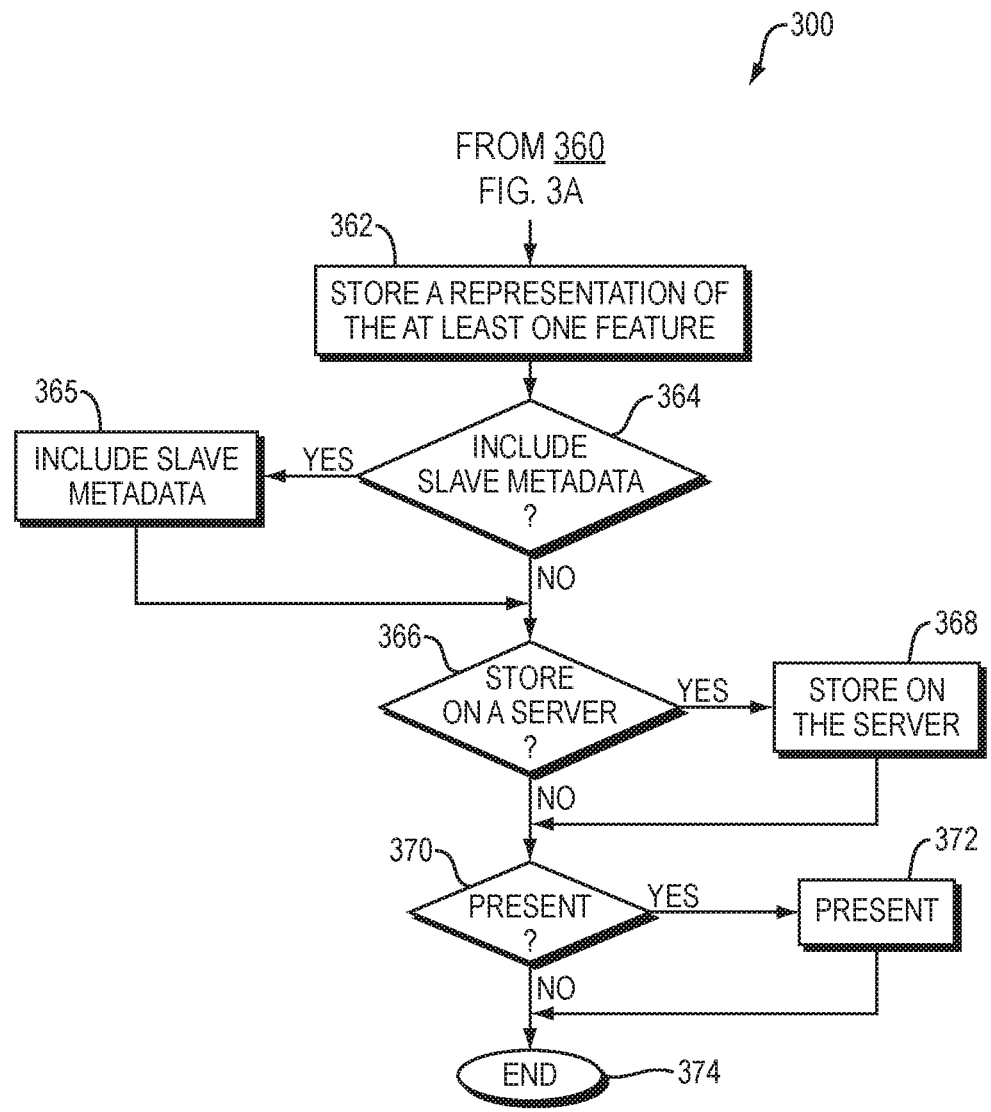

FIG. 3A and FIG. 3B illustrate a flow diagram of another embodiment of a method of enabling retrieval of information from a video surveillance system (300). The method may start (302) and decide whether or not continue during recording of the video scene (304) or to wait (306) for after recording (308). The method may continue and automatically identify an object of interest in a video scene of a master camera or a slave camera, the object of interest for the slave camera being determined as a function of metadata from the master camera (310). The method may check for whether or not to remove background objects from the video scene (312). If yes, identifying an object of interest may include applying background subtraction to remove background objects from the video scene (314) and the method may continue and check whether or not to track the object of interest by adjusting the slave camera's field of view based on object information included in the metadata from the master camera (316)

If tracking the object of interest by adjusting the slave camera's field of view based on object information included in the metadata from the master camera (318). The method may enable recording of a start time stamp indicating a start time of the slave camera's tracking the object and an end time stamp indicating an end time of the slave camera's tracking the object in the slave metadata (326). The method may check whether or not to direct the slave camera to a pan position (336). If yes, adjusting the slave camera's field of view may include directing the slave camera to a tilt position (338). The method may further check whether or not to direct the slave camera to a tilt position (340). If yes, adjusting the slave camera's field of view may include directing the slave camera to a tilt position (342) and the method may continue.

The method may check whether or not to zoom in on the object of interest and follow movement of the object of interest (320). If yes, the method may zoom in on the object of interest and follow movement of the object of interest (322). The method may further check for whether or not to process the video scene (328). If not, the method may continue and check if processing the video scene is to occur (328). If processing the video scene is not to occur (328), the method may continue and analyze one or more image frames of the slave camera during tracking (344).

If processing the video scene is to occur (328), processing the video scene at the slave camera may be based on the object information from the master camera and the slave metadata may include detailed object information extracted from the video scene by the slave camera (330). More sophisticated metadata extraction methods may be applied to the slave camera, because the slave camera may be in a constant state of movement. For example, two consecutive frames of the slave camera may be aligned by warping, and frame subtraction on the aligned frames may be used to detect and classify the object.

If processing the video scene, a check may be made for whether or not to search stored representations of the video scene (332). If processing includes searching, a search may be made on one or more image frames of the slave camera captured during tracking, the searching may be based on the object information included in the metadata from the master camera and the slave camera (334).

The method may analyze one or more image frames of the slave camera during tracking (344). The method may further extract detailed object information from the one or more image frames (346) and store the detailed object information extracted as the slave metadata (348) and the method may continue on a same path as would be taken if not tracking the object of interest by adjusting the slave camera's field of view (316). For example, the method may continue to automatically classify at least one feature in the object of interest (350).

A check may be made for whether or not the object of interest is a person, vehicle, or animal (352). Automatically classifying at least one feature in the object of interest may include categorizing the object of interest as a person, vehicle, or animal (354). Further, a check may be made as to whether or not the object of interest is stationary (356). If yes, automatically classifying at least one feature in the object of interest may include classifying movement of the object identified as stationary (358). If not, automatically classifying at least one feature in the object of interest may include classifying movement of the object identified as moving and a moving classification may further include an estimated rate of movement of the object identified (360).

The method may continue and store a representation of the at least one feature in a form of metadata, including the metadata from the master camera associated with video of at least the slave camera in a manner enabling retrieval of information about the object of interest (362). A check may be made for including slave metadata (364). If yes, slave metadata associated with the object identified may be included (365). The method may check whether or not to store the metadata on a server (366). If yes, the metadata may be stored on the server (368).

The method may further check whether or not to present the form of metadata of the object to a user (370). If yes, the method may present the form of metadata of the object identified to a user (374). If presenting, presenting the form of metadata of the object identified to a user may include presenting on any suitable display device. The method thereafter ends (374) in this example embodiment.

Figure 4:
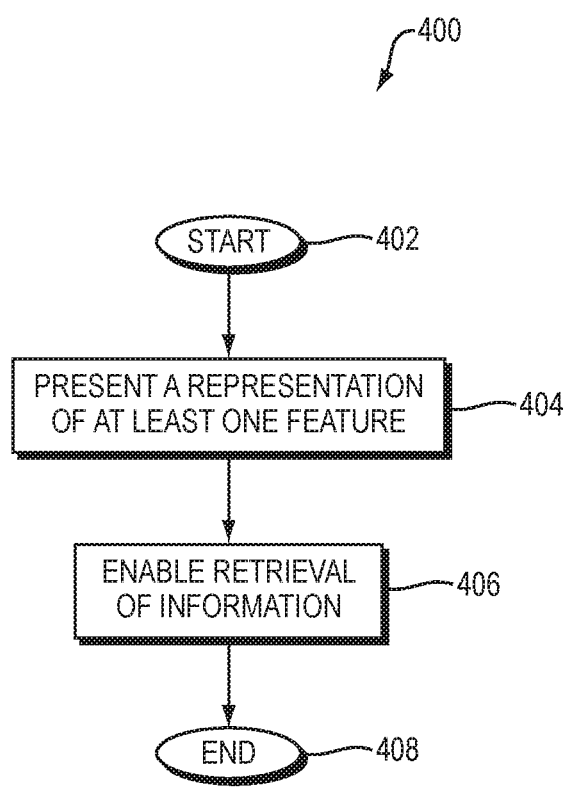
FIG. 4 illustrates a flow diagram of yet another embodiment of a method of enabling retrieval of information from a video surveillance system.

FIG. 4 illustrates a flow diagram of yet another embodiment of a method of enabling retrieval of information from a video surveillance system (400). The method may start (402) and present a representation of at least one feature in an object of interest in a form of metadata from a master camera and a slave camera (404) in a manner enabling retrieval of information about the object of interest (406). The method thereafter ends (408) in this example embodiment.

Figure 5:
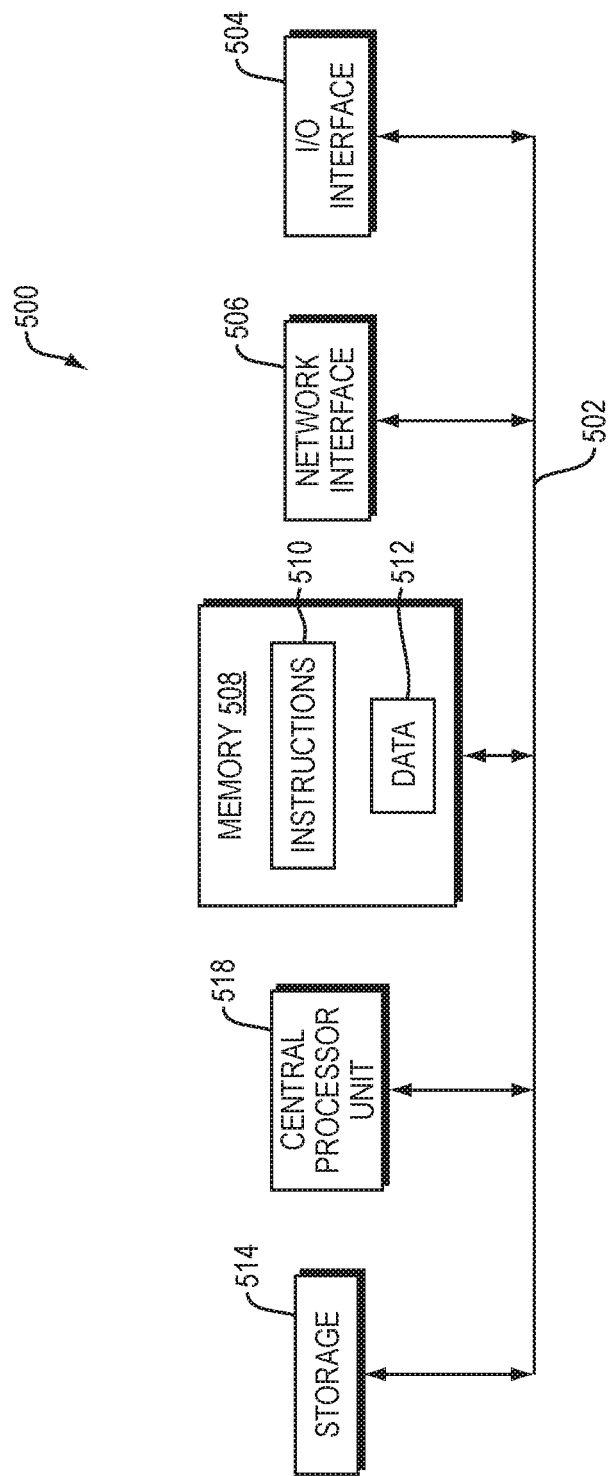
FIG. 5 is a block diagram of an example internal structure of a computer in which various embodiments of the present invention may be implemented.

FIG. 5 is a block diagram of an example internal structure of a computer 500 in which various embodiments of the present invention may be implemented. The computer 500 contains system bus 502, where a bus is a set of hardware lines used for data transfer among the components of a computer or processing system. Bus 502 is essentially a shared conduit that couples different elements of a computer system (e.g., processor, disk storage, memory, input/output ports, network ports, etc.) that enables the transfer of information between the elements. Coupled to system bus 502 is I/O device interface 504 for coupling various input and output devices (e.g., keyboard, mouse, displays, printers, speakers, etc.) to the computer 500. Network interface 506 allows the computer 500 to couple to various other devices attached to a network. Memory 508 provides volatile storage for computer software instructions 510 and data 512 may be used to implement embodiments of the present invention. Disk storage 514 provides non-volatile storage for computer software instructions 510 and data 512 that may be used to implement embodiments of the present invention. Central processor unit 518 is also coupled to system bus 502 and provides for the execution of computer instructions.

Example embodiments of the present invention may be configured using a computer program product; for example, controls may be programmed in software for implementing example embodiments of the present invention. Further example embodiments of the present invention may include a non-transitory computer readable medium containing instructions that may be loaded and executed by a processor, and, when executed, cause the processor to complete methods described herein. It should be understood that elements of the block and flow diagrams described herein may be implemented in software, hardware, firmware, or other similar implementation determined in the future. In addition, the elements of the block and flow diagrams described herein may be combined or divided in any manner in software, hardware, or firmware. If implemented in software, the software may be written in any language that can support the example embodiments disclosed herein. The software may be stored in any form of computer readable medium, such as random access memory (RAM), read only memory (ROM), compact disk read only memory (CD-ROM), and so forth. In operation, a general purpose or application specific processor loads and executes software in a manner well understood in the art. It should be understood further that the block and flow diagrams may include more or fewer elements, be arranged or oriented differently, or be represented differently. It should be understood that implementation may dictate the block, flow, and/or network diagrams and the number of block and flow diagrams illustrating the execution of embodiments of the invention.

While this invention has been particularly shown and described with references to example embodiments thereof, it will be understood by those skilled in the art that various changes in form and details may be made therein without departing from the scope of the invention encompassed by the appended claims.

What is claimed is:

1. A method of enabling retrieval of information from a video surveillance system, the method comprising:
    automatically identifying an object of interest in a video scene of a master camera or a slave camera;
    automatically classifying at least one feature of the object of interest to produce master and slave metadata, the object of interest for the slave camera being determined as a function of the master metadata;
    tracking the object of interest by adjusting the slave camera's field of view based on object information included in the master metadata, wherein adjusting the slave camera's field of view is further based on processing the video scene at the slave camera based on the master metadata; and storing the master and slave metadata in association with video of at least the slave camera in a manner that enables retrieval, of information about the object of interest, through use of the master or slave metadata, wherein the slave metadata includes detailed object information extracted from the video scene by the slave camera.

2. The method according to claim 1, wherein the storing includes storing the master and slave metadata in a database, and further wherein the manner that enables the retrieval of information about the object of interest includes:

creating a link between the master and slave metadata; and retrieving the video of the slave camera using the master or slave metadata and the link.

3. The method according to claim 1, wherein the manner that enables the retrieval of information about the object of interest further includes using the master and slave metadata.

4. The method according to claim 1, wherein the automatically identifying includes applying background subtraction to remove background objects from the video scene.

5. The method according to claim 1, wherein adjusting the slave camera's field of view includes zooming in on the object of interest and following movement of the object of interest.

6. The method according to claim 1, wherein the slave metadata further includes a start time stamp indicating a start time of the slave camera's tracking the object of interest and an end time stamp indicating an end time of the slave camera's tracking the object of interest.

7. The method according to claim 1, wherein processing the video scene includes searching of one or more image frames of the slave camera captured during tracking, the searching being based on the master metadata.

8. The method according to claim 1, wherein adjusting the slave camera's field of view includes directing the slave camera to a pan and tilt position, the method according to claim 5 further including:

analyzing one or more image frames of the slave camera during tracking;

extracting detailed object information from the one or more image frames; and storing the detailed object information extracted as the slave metadata.

9. The method according to claim 1, wherein automatically classifying the at least one feature of the object of interest includes categorizing the object of interest as a person, vehicle, or animal.

10. The method according to claim 1, wherein automatically classifying the at least one feature of the object of interest includes classifying movement of the object of interest as stationary or moving, wherein a moving classification further includes an estimated rate of movement of the object of interest.

11. The method according to claim 1, wherein the master or slave metadata further includes a time stamp, identified color, identified license plate number, aspect ratio, or bounding box for the object of interest.

12. The method according to claim 1, wherein the storing includes storing the master and slave metadata on a server.

13. The method according to claim 1, wherein the automatically identifying, automatically classifying, and storing occur during recording of the video scene.

14. The method according to claim 1, wherein the automatically identifying, classifying, and storing occur after recording of the video scene.

15. The method according to claim 1, further including presenting the master or slave metadata to a user.

16. A system for enabling retrieval of information from a video surveillance system, the system comprising:

a master camera, slave camera, and server communicatively coupled;

the master camera configured to identify an object of interest automatically in a video scene of the master camera and to communicate master metadata, produced by classifying at least one feature of the object of interest identified, to the slave camera and to the server;

the slave camera configured to determine slave metadata based on the master metadata communicated and to communicate the slave metadata to the server; and the server configured to store the master and slave metadata in a manner that enables retrieval of information about the object of interest, wherein the master camera is further configured to include a master bounding box for the video scene in the master metadata and the slave camera is further configured to define a slave bounding box for the video scene based on the master bounding box, the slave metadata including more detailed classification information, of the object of interest, than the master metadata, based on slave data of the video scene within the slave bounding box.

17. The system of claim 16, wherein the manner that enables retrieval of information about the object of interest includes creating a link between the master and slave metadata and further wherein the slave camera is further configured to communicate the slave metadata, the slave metadata including more detailed classification information, of the object of interest, than the master metadata, to the master camera or an indication that the master metadata communicated is incorrect.

18. The system of claim 16, wherein the slave camera is further configured to define the slave bounding box as a function of the master metadata from and its own processing of the video scene.

19. The system of claim 18 wherein the master metadata includes master data of objects within the master bounding box and the slave camera is further configured to use the master data to produce the slave metadata.

20. A method of enabling retrieval of information from a video surveillance system, the method comprising:

tracking an object of interest in a video scene by adjusting a slave camera's field of view based on object information included in master metadata, wherein adjusting the slave camera's field of view is further based on processing the video scene at the slave camera based on the master metadata; and presenting a representation of at least one feature of the object of interest in a form of master or slave metadata from the master camera and the slave camera, respectively, in a manner that enables retrieval, of information about the object of interest, through use of the master or slave metadata, wherein the slave metadata includes detailed object information extracted from the video scene by the slave camera.

21. The method of claim 20, wherein the metadata from the master camera includes classification information about the object of interest and the metadata from the slave camera includes more detailed classification information about the object of interest.

* * * * *

UNITED STATES PATENT AND TRADEMARK OFFICE
CERTIFICATE OF CORRECTION

PATENT NO. : 9,560,323 B2
APPLICATION NO. : 14/939222
DATED : January 31, 2017
INVENTOR(S) : Chien-Min Huang et al.

It is certified that error appears in the above-identified patent and that said Letters Patent is hereby corrected as shown below:

On the Title Page

In Item (72) Inventors: Delete "Farzin Aghdasi, Clovis, MA (US)" and insert --Farzin Aghdasi, Clovis, CA (US)--

Signed and Sealed this
Thirteenth Day of June, 2017

Joseph Matal
*Performing the Functions and Duties of the*
*Under Secretary of Commerce for Intellectual Property and*
*Director of the United States Patent and Trademark Office*